United States Patent
Hayashi et al.

(10) Patent No.: US 7,817,177 B2
(45) Date of Patent: Oct. 19, 2010

(54) OPTICAL SCANNING DEVICE AND IMAGE FORMING APPARATUS

(75) Inventors: Yoshinori Hayashi, Kanagawa (JP);
Tomoya Ohsugi, Kanagawa (JP);
Kenichiroh Saisho, Kanagawa (JP);
Yasuhiro Naoe, Kanagawa (JP);
Hiroyuki Okuwaki, Kanagawa (JP);
Ryouji Hirai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 137 days.

(21) Appl. No.: 11/382,587

(22) Filed: May 10, 2006

(65) Prior Publication Data
US 2006/0284968 A1 Dec. 21, 2006

(30) Foreign Application Priority Data
Jun. 20, 2005 (JP) .............................. 2005-179828

(51) Int. Cl.
*B41J 2/385* (2006.01)
*B41J 2/41* (2006.01)
*B41J 2/47* (2006.01)
*B41J 2/435* (2006.01)
*B41J 27/00* (2006.01)
*G02B 7/182* (2006.01)

(52) U.S. Cl. ...................... 347/242; 347/138; 347/152; 347/245; 347/257; 347/263; 359/871

(58) Field of Classification Search ........................ None
See application file for complete search history.

(56) References Cited

U.S. PATENT DOCUMENTS

| 5,194,993 | A | * | 3/1993 | Bedzyk ...................... 359/813 |
| 5,331,343 | A | * | 7/1994 | Ono et al. ................... 347/257 |
| 5,506,719 | A | | 4/1996 | Murakami et al. |
| 5,758,950 | A | | 6/1998 | Naoe et al. |
| 5,808,772 | A | * | 9/1998 | Yamaguchi et al. ....... 359/204.1 |
| 5,952,650 | A | * | 9/1999 | Uzuki ........................ 250/235 |

(Continued)

FOREIGN PATENT DOCUMENTS

JP    6-21009    3/1994

(Continued)

OTHER PUBLICATIONS

U.S. Appl. No. 11/844,643, filed Aug. 24, 2007, Saisho, et al.

(Continued)

*Primary Examiner*—Matthew Luu
*Assistant Examiner*—Kendrick X Liu
(74) *Attorney, Agent, or Firm*—Oblon, Spivak, McClelland, Maier & Neustadt, L.L.P.

(57) ABSTRACT

An optical scanning device includes a light source, a deflector that deflects a light beam from the light source, a first optical system that guides the light beam to the deflector, a second optical system that guides the light beam from the deflector to a surface to be scanned, and a housing that holds the light source and the deflector. At least one optical element included in the first optical system or the second optical system is attached to the housing via an intermediate member. The optical element is adjustable with respect to the intermediate member. The number of directions in which the optical element can be adjusted is two or more.

21 Claims, 4 Drawing Sheets

U.S. PATENT DOCUMENTS

| | | | |
|---|---|---|---|
| 5,991,063 A * | 11/1999 | Ando | 359/204 |
| 5,997,153 A | 12/1999 | Naoe et al. | |
| 6,097,749 A | 8/2000 | Naoe et al. | |
| 6,179,445 B1 | 1/2001 | Naoe et al. | |
| 6,299,331 B1 | 10/2001 | Naoe et al. | |
| 6,343,092 B1 | 1/2002 | Naoe et al. | |
| 6,502,960 B2 | 1/2003 | Naoe et al. | |
| 6,574,054 B2 | 6/2003 | Hirai et al. | |
| 6,687,283 B2 | 2/2004 | Naoe | |
| 6,795,257 B2 | 9/2004 | Andoh et al. | |
| 6,798,820 B2 | 9/2004 | Okuwaki et al. | |
| 6,844,892 B2 * | 1/2005 | Iima et al. | 347/243 |
| 6,992,279 B2 | 1/2006 | Okuwaki et al. | |
| 7,295,225 B2 * | 11/2007 | Ohsugi | 347/244 |
| 2004/0036936 A1 | 2/2004 | Nakajima et al. | |
| 2004/0100673 A1 * | 5/2004 | Sakai et al. | 359/216 |
| 2004/0125192 A1 | 7/2004 | Ohsugi | |

FOREIGN PATENT DOCUMENTS

| | | |
|---|---|---|
| JP | 6-175058 | 6/1994 |
| JP | 7-168115 | 7/1995 |
| JP | 2001-143296 | 5/2001 |
| JP | 2002-6188 | 1/2002 |
| JP | 2002-31773 | 1/2002 |
| JP | 2002-365570 | 12/2002 |
| JP | 2004-109297 | 4/2004 |
| JP | 2004-163607 | 6/2004 |

OTHER PUBLICATIONS

U.S. Appl. No. 11/850,401, filed Sep. 5, 2007, Saisho, et al.
U.S. Appl. No. 11/782,268, filed Jul. 24, 2007, Ichii, et al.
U.S. Appl. No. 11/857,811, filed Sep. 19, 2007, Hayashi, et al.
U.S. Appl. No. 11/873,069, filed Oct. 16, 2007, Okuwaki, et al.
U.S. Appl. No. 12/024,505, filed Feb. 1, 2008, Watanabe, et al.
U.S. Appl. No. 12/021,850, filed Jan. 29, 2008, Watanabe, et al.
U.S. Appl. No. 12/020,292, filed Jan. 25, 2008, Miyatake, et al.
U.S. Appl. No. 12/031,362, filed Feb. 14, 2008, Arai, et al.
U.S. Appl. No. 12/174,899, filed Jul. 17, 2008, Saisho, et al.
U.S. Appl. No. 12/189,430, filed Aug. 11, 2008, Saisho.

* cited by examiner

OPTICAL SCANNING DEVICE AND IMAGE FORMING APPARATUS

CROSS-REFERENCE TO RELATED APPLICATIONS

The present document incorporates by reference the entire contents of Japanese priority document, 2005-179828 filed in Japan on Jun. 20, 2005.

BACKGROUND OF THE INVENTION

1. Field of the Invention

The present invention relates to an optical scanning device that forms a latent image on an image carrier and an image forming apparatus employing the optical scanning device.

2. Description of the Related Art

Recently, along with an improvement in the quality and density growth in image forming apparatuses such as a laser printer, there are increasing demands for reduction in diameter of a beam spot, reduction in positional deviation of the beam spot, and cost reduction in optical scanning devices.

To satisfy these demands, although there is an approach of working respective optical parts with high precision and arranging the optical parts in a housing with high precision, the cost for manufacturing the optical parts increases. Even if an optical part is worked precisely, there is a limitation in obtainable optical characteristic by the work.

Japanese Patent Application Laid-Open No. 2002-365570 discloses an optical scanning device in which an optical element disposed in front of a deflector is held by a second holding tool, the second holding tool is attached to a first holding tool, the second holding tool is set to be adjustable to the first holding tool in an optical axis direction, and the optical element is set to be adjustable to the second holding tool in an optical axis direction.

According to the approach described in Japanese Patent Application Laid-Open No. 2002-365570, since adjustment can be performed in only one direction (the optical axis direction), there is a problem that adjustment can be performed only for a beam waist position (beam spot position adjustment).

SUMMARY OF THE INVENTION

It is an object of the present invention to at least solve the problems in the conventional technology.

An optical scanning device according to one aspect of the present invention includes a light source that emits a light beam; a deflector that deflects the light beam from the light source; a first optical system that guides the light beam from the light source to the deflector; a second optical system that guides the light beam from the deflector to a surface to be scanned; and a housing that holds the light source and the deflector. At least one optical element included in one of the first optical system and the second optical system is attached to the housing via an intermediate member. The optical element is adjustable with respect to the intermediate member. The number of directions in which the optical element can be adjusted with respect to the intermediate member is two or more.

An optical scanning device according to another aspect of the present invention includes a light source that emits a light beam; a deflector that deflects the light beam from the light source; a first optical system that guides the light beam from the light source to the deflector; a second optical system that guides the light beam from the deflector to a surface to be scanned; and a housing that holds the light source and the deflector. At least one optical element included in one of the first optical system and the second optical system is attached to the housing via an intermediate member. The intermediate member is adjustable with respect to the housing. The number of directions in which the intermediate member can be adjusted with respect to the housing is two or more.

An optical scanning device according to still another aspect of the present invention includes a light source that emits a light beam; a deflector that deflects the light beam from the light source; a first optical system that guides the light beam from the light source to the deflector; a second optical system that guides the light beam from the deflector to a surface to be scanned; and a housing that holds the light source and the deflector. At least one optical element included in one of the first optical system and the second optical system is attached to the housing via an intermediate member. The intermediate member is adjustable with respect to the housing. The optical element is adjustable with respect to the intermediate member. At least one of adjustable directions of the intermediate member with respect to the housing is different from at least one of adjustable directions of the optical element with respect to the intermediate member.

An image forming apparatus according to still another aspect of the present invention includes an optical scanning device that includes a light source that emits a light beam; a deflector that deflects the light beam from the light source; a first optical system that guides the light beam from the light source to the deflector; a second optical system that guides the light beam from the deflector to a surface to be scanned; and a housing that holds the light source and the deflector. At least one optical element included in one of the first optical system and the second optical system is attached to the housing via an intermediate member. The optical element is adjustable with respect to the intermediate member. The number of directions in which the optical element can be adjusted with respect to the intermediate member is two or more.

An image forming apparatus according to still another aspect of the present invention includes an optical scanning device that includes a light source that emits a light beam; a deflector that deflects the light beam from the light source; a first optical system that guides the light beam from the light source to the deflector; a second optical system that guides the light beam from the deflector to a surface to be scanned; and a housing that holds the light source and the deflector. At least one optical element included in one of the first optical system and the second optical system is attached to the housing via an intermediate member. The intermediate member is adjustable with respect to the housing. The number of directions in which the intermediate member can be adjusted with respect to the housing is two or more.

An image forming apparatus according to still another aspect of the present invention includes an optical scanning device that includes a light source that emits a light beam; a deflector that deflects the light beam from the light source; a first optical system that guides the light beam from the light source to the deflector; a second optical system that guides the light beam from the deflector to a surface to be scanned; and a housing that holds the light source and the deflector. At least one optical element included in one of the first optical system and the second optical system is attached to the housing via an intermediate member. The intermediate member is adjustable with respect to the housing. The optical element is adjustable with respect to the intermediate member. At least one of adjustable directions of the intermediate member with respect to the housing is different from at least one of adjustable directions of the optical element with respect to the intermediate member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings.

Figure 1:
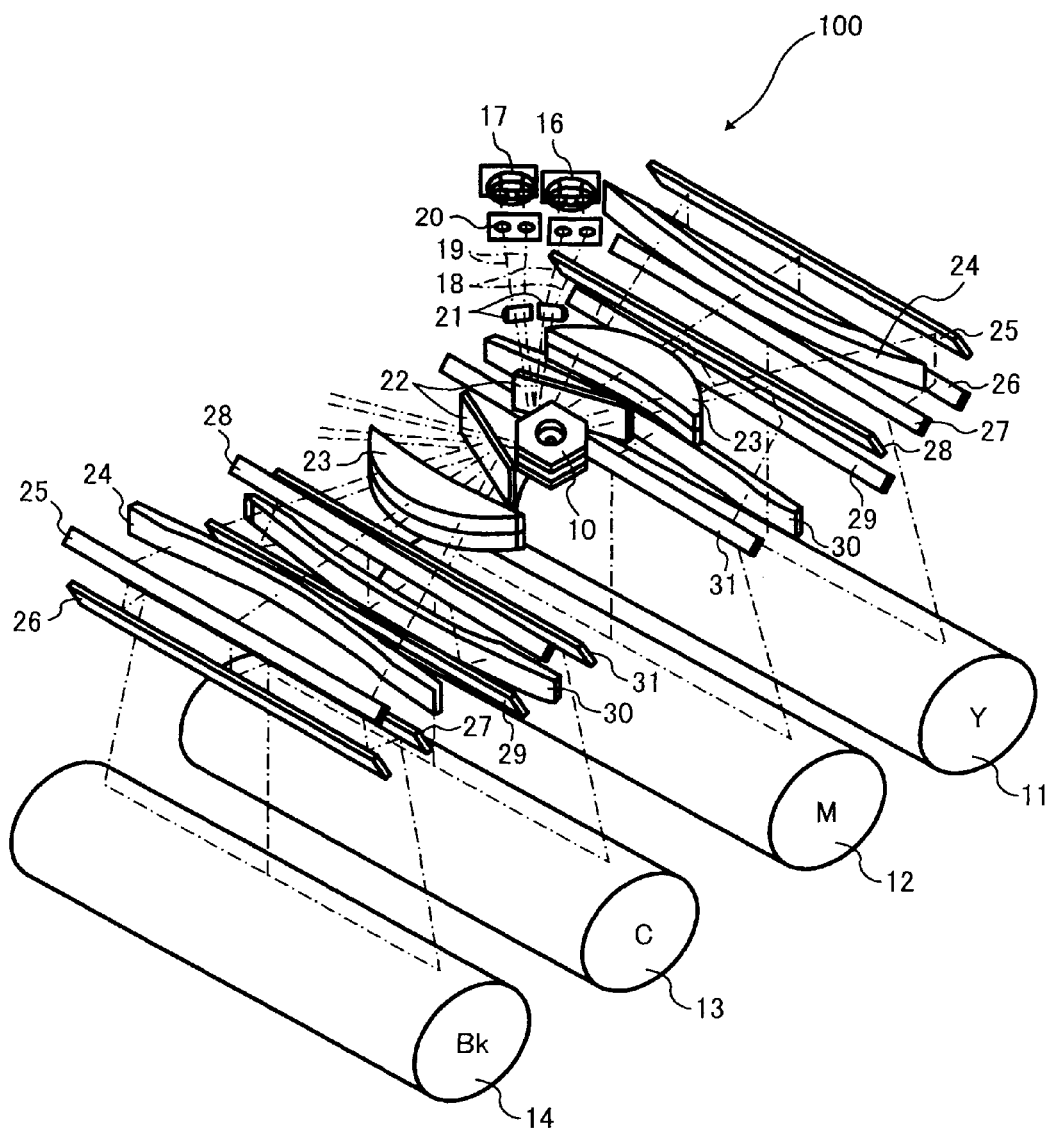
FIG. 1 is a perspective view of an optical scanning device according to a first embodiment of the present invention.

FIG. 1 is a perspective view of an optical scanning device 100 according to a first embodiment of the present invention. The optical scanning device 100 has a configuration of a facing scanning system in which electrostatic latent images are respectively formed on four photosensitive drums (image carriers) using one polygon scanner (deflector) 10.

Four photosensitive drums 11, 12, 13, and 14 are arranged along a moving direction of an intermediate transfer belt 15 (see FIG. 4) at equal intervals, and they form a color image by sequentially transferring toner images with different colors to superimpose the images.

According to the first embodiment, a pair of semiconductor lasers described later are arranged to each of the photosensitive drums 11, 12, 13, and 14 so that two lines are simultaneously scanned by performing scanning while being shifted by one line according to a recording density in a sub-scanning direction.

Light source units 16 and 17 are provided to correspond to the photosensitive drums 11 and 12 on one scanning side, and the respective light source units 16 and 17 are disposed such that their light beams 18 or 19 are different in an emitting position along a sub-scanning direction for each light source unit.

The light source units 16 and 17 each have a pair of semiconductor lasers (LD) serving as a pair of light sources and a pair of coupling lens for coupling divergent beams from the respective semiconductor lasers provided integrally.

After the light beam 18 from the light source unit 16 serving as reference passes through the coupling lens, an aperture 20, a cylindrical lens 21, and a soundproof glass 22 to be deflected by an upper stage of the polygon scanner 10, it passes through an upper layer of an fθ lens 23 and passes through a toroidal lens 24 to be reflected by folding mirrors 25, 26, and 27, so that the reflected beam is introduced to the photosensitive drum 11 to form a latent image for an yellow image on a face thereof (a surface to be scanned).

The cylindrical lens 21 has power only in the sub-scanning direction and it forms a line image near a polygon reflecting face. The aperture 20 is for obtaining a desired beam spot diameter on a surface of a photoconductor even if a diverging angle of an LD fluctuates.

After the light beam 19 from the light source unit 17 passes through the coupling lens, the aperture 20, the cylindrical lens 21, and the soundproof glass 22 to be deflected by a lower stage of the polygon scanner 10, it passes through a lower layer of the fθ lens 23 to be reflected by folding mirrors 28 and 29, and passes through a toroidal lens 30 to be reflected by a folding mirror 31, so that the reflected beam is introduced to the photosensitive drum 12 to form a latent image for a magenta image on a face thereof (a surface to be scanned).

On the other scanning side similarly, an light beam from a light source unit serving as reference is introduced to the photosensitive drum 14 to form a latent image for a black image on a face thereof (a surface to be scanned) and an light beam from another light source unit is introduced to the photosensitive drum 13 to form a latent image for a cyan image on a face thereof (a surface to be scanned).

The coupling lens, the aperture 20, the cylindrical lens 21, the soundproof glass 22, and the like constitute a first optical system that introduces an light beam from the semiconductor laser to the polygon scanner 10, while the fθ lens 23, the toroidal lens 24 and 30, the respective folding mirrors, and the like constitute a second optical system that introduces an light beam from the polygon scanner 10 to the surface to be scanned.

Though not shown, detectors, which detect an light beam prior to starting of writing-in, are respectively disposed on the respective scanning sides.

Since the cylindrical lens 21 is an anamorphic optical element, beam waist diameter thickening occurs due to an eccentric error about an axis parallel to an optical axis, an arrangement error in a sub-scanning direction, or eccentricity about an axis parallel to the sub-scanning direction.

To adjust a beam waist position in the sub-scanning direction, it is necessary to perform adjustment in an optical axis direction.

Accordingly, by simultaneously performing (1) eccentricity adjustment about the axis parallel to the optical axis, (2) arrangement adjustment in the sub-scanning direction, (3) eccentricity adjustment about the axis parallel to the sub-scanning direction, and (4) adjustment in the optical axis direction, a diameter of a beam spot can be reduced, a positional deviation of a beam spot can be reduced, and a part tolerance of an optical element can be relaxed, thereby reducing the cost.

An adjustment structure of the cylindrical lens 21 which is one optical element included in the first optical system will be explained with reference to FIGS. 2 and 3.

Figure 2:
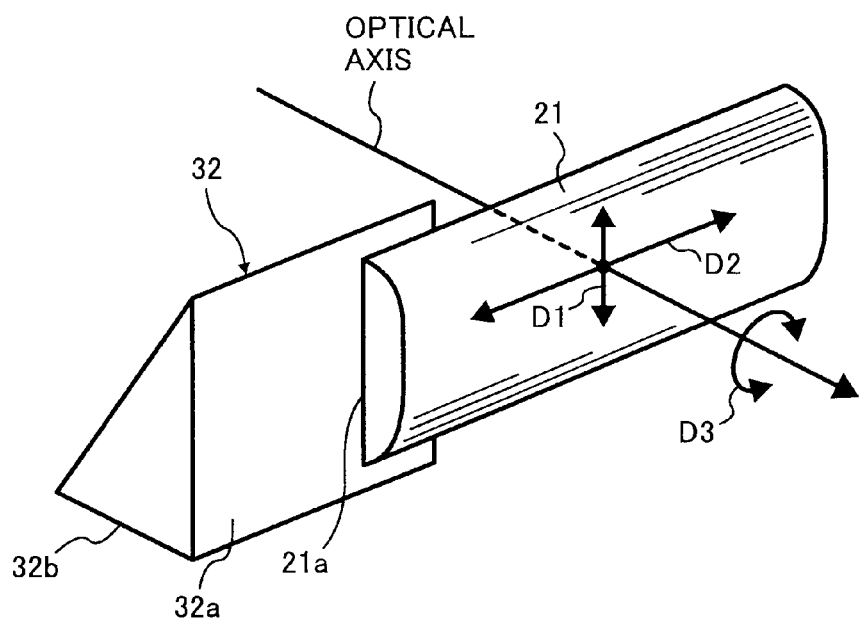
FIG. 2 is a perspective view of a positional relationship between an intermediate member and fixation of a cylindrical lens.

As shown in FIG. 2, the cylindrical lens 21 is attached to a housing 33 of the optical scanning device via an intermediate member 32. The intermediate member 32 in this embodiment has a triangular prism shape, and it has a flat portion 32a abutting on the cylindrical lens 21, and another flat portion 32b perpendicular to the flat portion 32a and abutting on the housing 33.

While the cylindrical lens 21 is fixed to the intermediate member 32 such that one end thereof in a longitudinal direction cantilevers, it can be subjected to arrangement adjustment in a sub-scanning direction (a direction of arrow D1), arrangement adjustment in a main scanning direction (a direction of arrow D2), and eccentricity adjustment about an axis parallel to an optical axis (a direction of arrow D3) before being fixed to the flat portion 32a of the intermediate member 32.

In other words, the intermediate member 32 has the flat portion 32a which is a flat face perpendicular to the optical axis of the cylindrical lens 21, so that adjustment, in an eccentric direction, of the cylindrical lens 21 about the optical axis and adjustment thereof in a direction perpendicular to the optical axis can be performed.

Figure 3:
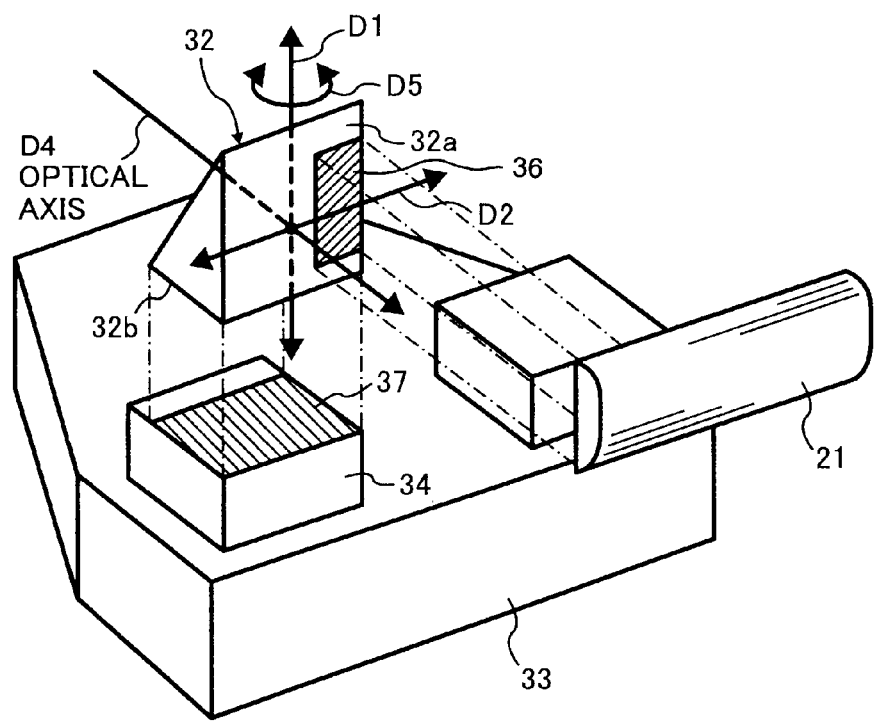
FIG. 3 is a perspective view of a positional relationship between fixation of the intermediate member to a housing and fixation of the cylindrical lens to the intermediate member.

As shown in FIG. 3, the intermediate member 32 can be subjected to arrangement adjustment in an optical axis direction (a direction of arrow D4), arrangement adjustment in a main scanning direction (a direction of arrow D2), eccentricity adjustment about an axis (a direction of arrow D5) parallel to a sub-scanning direction before it is fixed to an upper face of a projecting portion 34 of the housing 33. The intermediate member 32 is formed from a transparent material (for example, plastic material).

Accordingly, there are two or more adjustable directions of the cylindrical lens 21 to the intermediate member 32 and there are two or more adjustable directions of the intermediate member 32 to the housing 33.

At least one of the adjustable directions of the intermediate member 32 to the housing 33 and at least one of the adjustable directions of the cylindrical lens 21 to the intermediate member 32 are different from each other.

With such a supporting structure, a plurality of excellent optical characteristics (reduction in beam waist diameter thickening, reduction in beam waist position deviation, and reduction in beam spot position deviation) can be achieved simultaneously.

In a multi-beam system shown in FIG. 1, scanning line spacing in the sub-scanning direction can be set optimally by making eccentricity of the cylindrical lens 21 adjustable about the axis parallel to the optical axis. In FIG. 3, numerals 36 and 37 each denote an application face (a fixing face or an adhering face) of adhesive.

While being held by a jig (not shown), the cylindrical lens 21 is moved in a direction to be adjusted (a position in the optical axis direction, eccentricity about the axis parallel to the optical axis, and a position in the sub-scanning direction).

Thereafter, the intermediate member 32 whose application face 36 has been applied with ultraviolet curing resin is pressed (temporarily fixed) to the flat portion 21a of the cylindrical lens 21 and the application face 37 of the housing 33 applied with ultraviolet curing resin, and the cylindrical lens 21 and the intermediate member 32 are fixed by irradiating ultraviolet rays.

Since the intermediate member 32 is formed from the transparent material, flexibility of ultraviolet irradiation is high and the irradiation is conducted easily so that fixing can be performed fast and evenly.

As apparent from the above explanation, the term "adjustable" in this embodiment includes the meaning that initial adjustment is possible, that adjustment is possible after assembling, and that there is no positioning reference.

With the above configuration, adjustment can be performed easily in a plurality of directions with a simple configuration.

With a configuration in which an optical element is held by the intermediate member, it is unnecessary to prepare positioning references corresponding to respective apparatus models, which is effective in standardization of an optical element and standardization of a housing, thereby facilitating recycling (leading to environmental protection).

Figure 4:
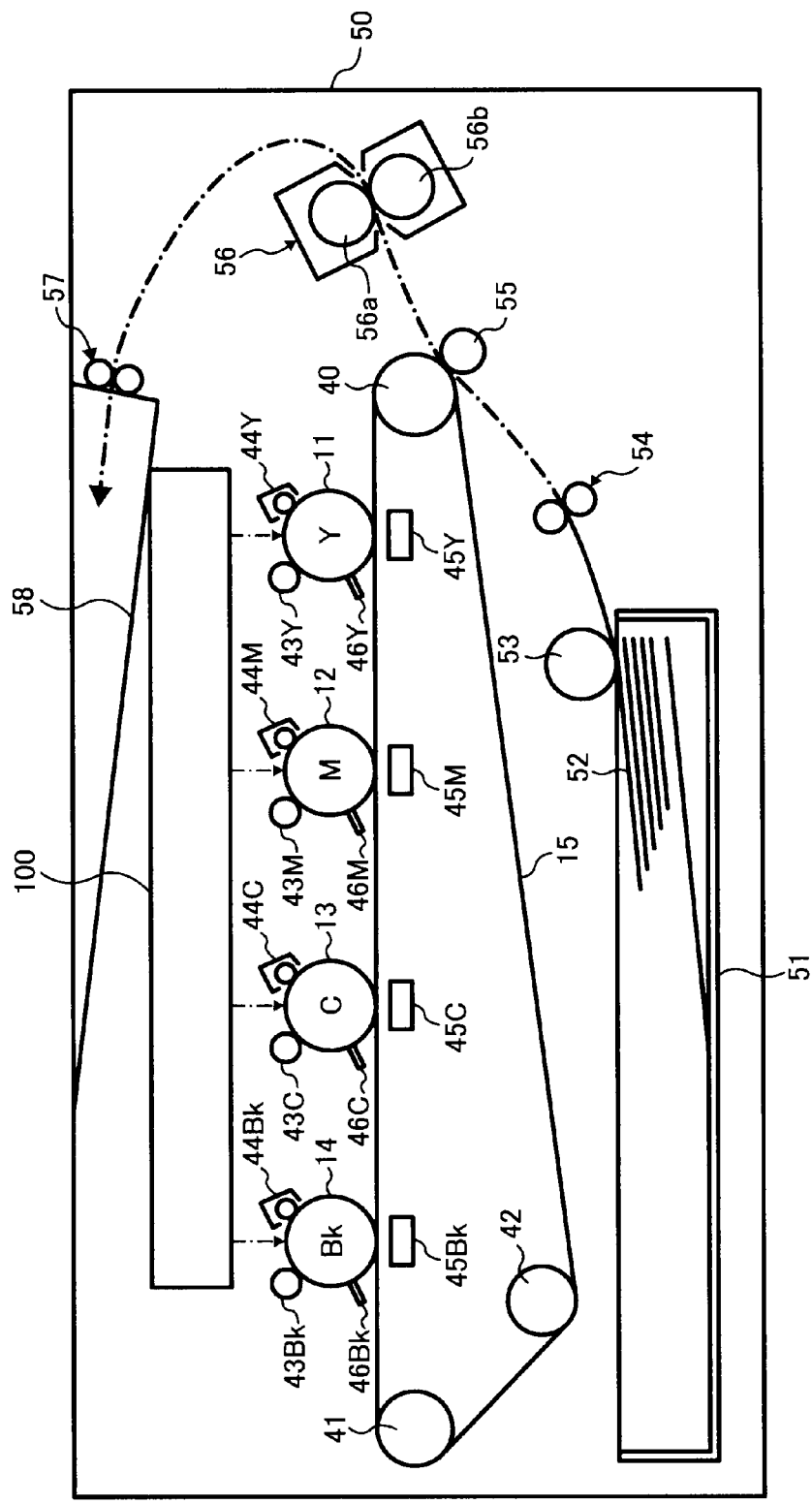
FIG. 4 is a front view of an image forming apparatus.

An outline of a configuration of a color image forming apparatus having the optical scanning device 100 in this embodiment will be explained with reference to FIG. 4.

A color image forming apparatus 50 includes the intermediate transfer belt 15 serving as an intermediate transfer member, in which respective image forming stations having the photosensitive drums 11, 12, 13, and 14 are arranged along a moving direction of the intermediate transfer belt 15 in parallel.

An yellow (Y) toner image is formed on the image forming station having the photosensitive drum 11, a magenta (M) toner image is formed on the image forming station having the photosensitive drum 12, a cyan (C) toner image is formed on the image forming station having the photosensitive drum 13, and a black (Bk) toner image is formed on the image forming station having the photosensitive drum 14.

The image forming station that forms a yellow toner image will be explained as a typical example. A charger 43Y that evenly charges a surface of the photosensitive drum 11, a developing device 44Y that adheres charged toner to an electrostatic latent image formed by the optical scanning device 100 to visualize the latent image, a transfer unit 45Y that is provided inside the intermediate transfer belt 15 and primarily transfers a toner image on the photosensitive drum 11 to the intermediate transfer belt 15, and a cleaner 46Y that removes toner remaining on the photosensitive drum 11 after transferred are arranged around the photosensitive drum 11.

Since the remaining image forming stations have the same configuration, they are distinguished from one another using alphabets indicating corresponding colors, and explanation thereof is omitted.

The intermediate transfer belt 15 is spanned around three rollers 40, 41, and 42 and is supported by the rollers, and it is rotationally driven in a counterclockwise direction. Respective toner images corresponding to yellow, magenta, cyan, and black are sequentially and timely transferred on the intermediate transfer belt 15 to be superimposed to form a color image thereon.

Sheets of recording paper 52 that are sheet-like recording medium are fed from a paper feed tray 51 by a paper feed roll 53 such that they are sequentially provided from the uppermost sheet one by one, and they are fed out to a secondary transfer portion by a registration roller pair 54 at a timing corresponding to start of recording in a sub-scanning direction.

The color images superimposed on the intermediate transfer belt 15 are collectively transferred on the recording paper 52 by a secondary transfer roller 55 serving as a secondary transfer unit at the secondary transfer portion. The recording paper 52 transferred with the color images is fed to a fixing device 56 having a fixing roller 56a and a pressure roller 56b, where the color images are fixed. The recording sheet 52 fixed with the images is discharged to a paper discharge tray 58 formed on an upper face of the image forming apparatus main unit by a paper discharge roller pair 57 to be stacked thereon.

Figure 5:
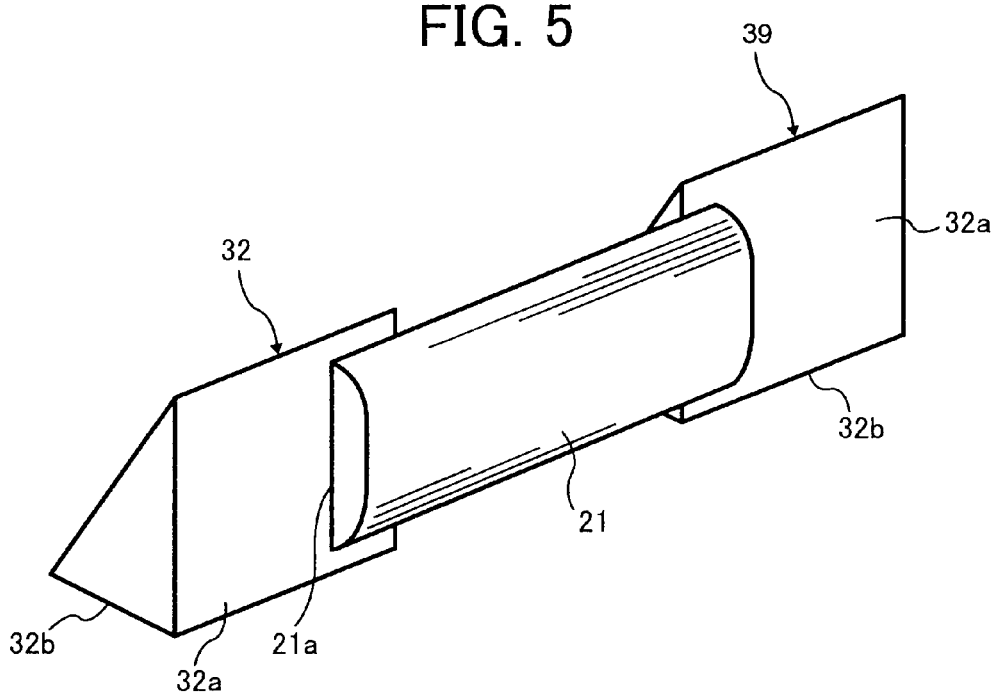
FIG. 5 is a perspective view of a positional relationship between an intermediate member and fixation of a cylindrical lens according to a second embodiment of the present invention.
Figure 6:
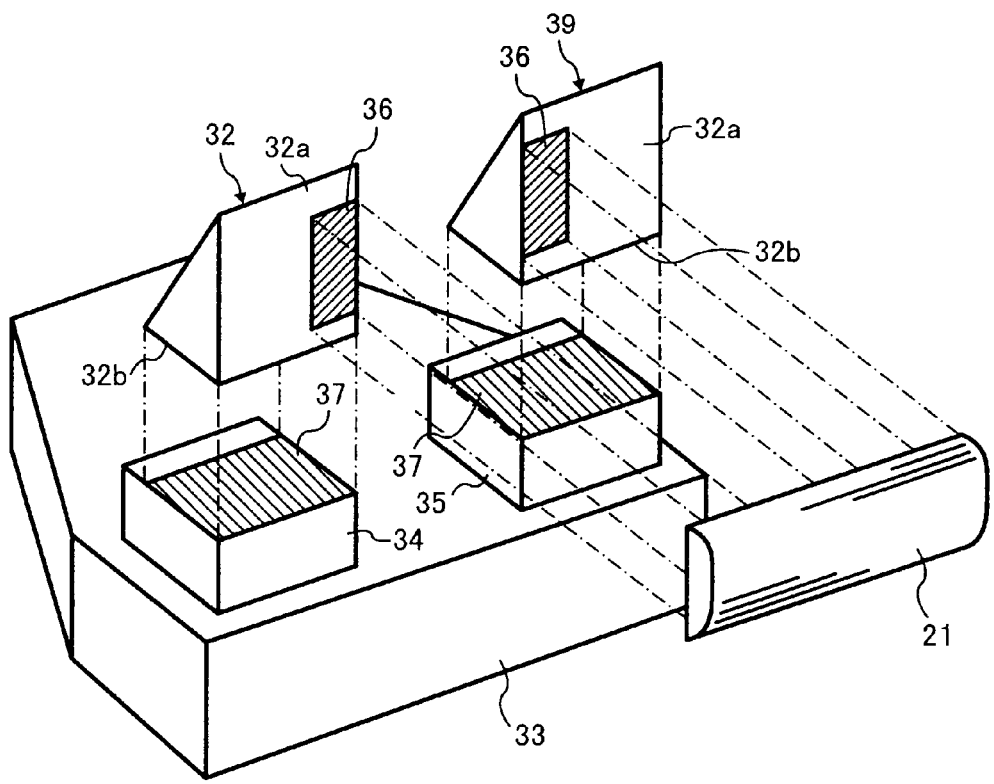
FIG. 6 is a perspective view of a positional relationship between fixation of the intermediate member to a housing and fixation of the cylindrical lens to the intermediate member according to the second embodiment.

FIG. 5 is a perspective view of a positional relationship between an intermediate member and fixation of a cylindrical lens according to a second embodiment of the present invention. FIG. 6 is a perspective view of a positional relationship between fixation of the intermediate member to a housing and fixation of the cylindrical lens to the intermediate member according to the second embodiment. Like reference numerals designate like parts as those in the first embodiment. Accordingly, redundant explanations of the already mentioned configurations and functions will be omitted unless particularly necessary, and only relevant parts thereof will be explained.

According to the first embodiment, the cylindrical lens 21 is fixed to one intermediate member 32 in a cantilever manner. However, according to the second embodiment, the cylindrical lens 21 is fixed to a plurality of intermediate members. For example, intermediate members 32 and 39.

As shown in FIG. 5, two intermediate members 32 and 39 are arranged such that they are positioned on both sides regarding an light beam passing through the cylindrical lens 21, namely, so as to provide spacing along a longer size direction (here, in a sub-scanning direction) of a main scanning direction and a sub-scanning direction of the cylindrical lens 21 regarding an sizes of an outer shape thereof, where respective end portions of the cylindrical lens 21 are fixed to respective flat portions 32a of the intermediate members 32 and 39.

One intermediate member 32 is fixed to an upper face of the projecting portion 34 of the housing 33, while the other intermediate member 39 is fixed on an upper face of a projection portion 35.

Fixing is performed similarly to the first embodiment by making the intermediate member 32 abut on the cylindrical lens 21 after positioning the cylindrical lens 21, and then irradiating ultraviolet rays.

With such a fixing (supporting) configuration, for example, when the housing 33 and the intermediate member (here, the synthetic resin) 32 are different in linear coefficient of expansion, since stresses are generated at symmetrical portions in the optical element (the cylindrical lens 21) regarding the optical axis even if temperature rises, posture change of the optical element due to temperature fluctuation is reduced.

With the configuration in which two intermediate members 32 and 39 are arranged with spacing in a longer size direction of the main scanning direction and the sub-scanning direction regarding sizes of the outer shapes of the cylindrical lens 21, allowance to an arrangement error can be improved and an eccentricity error can be reduced.

The exemplary embodiments describe examples in which the present invention has been applied to the image forming apparatus of the so-called tandem type in which a plurality of scanning optical systems are provided. However, the present invention can be similarly applied to an image forming apparatus with only one scanning optical system.

According to an embodiment of the present invention, diameter of a beam spot can be reduced, positional deviation of the beam spot can be reduced, part tolerance of the optical element can be relaxed, and the cost can be reduced. Optical parts can be commonly used, thereby facilitating recycling (environmental protection).

Furthermore, according to an embodiment of the present invention, posture change of the optical element due to fluctuation of environmental conditions can be suppressed and excellent optical characteristic can be obtained.

Moreover, according to an embodiment of the present invention, movement adjustment in two directions can be performed, thereby facilitating ensuring of optical characteristic.

Furthermore, according to an embodiment of the present invention, adjustment with a simple and low cost configuration is facilitated.

Moreover, according to an embodiment of the present invention, thickening in beam waist diameter can be reduced the beam spot diameter can also be reduced.

Furthermore, according to an embodiment of the present invention, an image forming apparatus achieving high image quality can be provided.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
a light source that emits a light beam;
a deflector that deflects the light beam from the light source;
a first optical system that guides the light beam from the light source to the deflector;
a second optical system that guides the light beam from the deflector to a surface to be scanned; and
a housing that holds the light source and the deflector,
wherein at least one optical element included in one of the first optical system and the second optical system is attached to the housing via at least one intermediate member, the optical element configured to be eccentrically adjusted about an axis parallel to at least a sub-scanning direction,
wherein the optical element is configured to be adjusted in two or more directions with respect to the at least one intermediate member,
wherein the at least one intermediate member includes a surface which abuts the optical element and is fixed to the optical element by adhesion, and
wherein the at least one intermediate member further includes a surface which abuts the housing and is fixed to the housing by adhesion, and wherein the at least one intermediate member is configured to be adjusted in two or more directions with respect to the housing.

2. The optical scanning device according to claim 1, wherein
a plurality of the intermediate members are provided, and
the plurality of intermediate members are arranged on both sides of the light beam passing through the optical element.

3. The optical scanning device according to claim 1, wherein
the at least one intermediate member has two flat portions that are orthogonal to each other and abut on the optical element and the housing.

4. The optical scanning device according to claim 1, wherein
the at least one intermediate member is transparent, and
the adhesive is made from ultraviolet curing resin.

5. The optical scanning device according to claim 1, wherein
the optical element is an anamorphic optical element included in the first optical system,
the at least one intermediate member is configured to be adjusted in an optical axis direction, and
the anamorphic optical element is configured to be adjusted with respect to the at least one intermediate member in a plane perpendicular to the optical axis direction.

6. The optical scanning device according to claim 1, wherein the at least one intermediate member is configured to be adjusted with respect to the housing.

7. The optical scanning device according to claim 6, wherein the optical element is a cylindrical lens.

8. An optical scanning device comprising:
a light source that emits a light beam;
a deflector that deflects the light beam from the light source;
a first optical system that guides the light beam from the light source to the deflector;
a second optical system that guides the light beam from the deflector to a surface to be scanned; and
a housing that holds the light source and the deflector,
wherein at least one optical element included in one of the first optical system and the second optical system is attached to the housing via at least one intermediate member, the optical element configured to be eccentrically adjusted about an axis parallel to at least a sub-scanning direction,
wherein the at least one intermediate member is configured to be adjusted in two or more directions with respect to the housing,
wherein the at least one intermediate member includes a surface which abuts the optical element and is fixed to the optical element by adhesion, and
wherein the at least one intermediate member further includes a surface which abuts the housing and is fixed to the housing by adhesion.

9. The optical scanning device according to claim 8, wherein
a plurality of the intermediate members are provided, and
the plurality of intermediate members are arranged on both sides of the light beam passing through the optical element.

10. The optical scanning device according to claim 8, wherein
the at least one intermediate member has two flat portions that are orthogonal to each other and abut on the optical element and the housing.

11. The optical scanning device according to claim 8, wherein
the at least one intermediate member is transparent, and
the adhesive is made from ultraviolet curing resin.

12. The optical scanning device according to claim 8, wherein
the optical element is an anamorphic optical element included in the first optical system,
the at least one intermediate member is configured to be adjusted in an optical axis direction, and
the anamorphic optical element is configured to be adjusted with respect to the at least one intermediate member in a plane perpendicular to the optical axis direction.

13. An optical scanning device comprising:
a light source that emits a light beam;
a deflector that deflects the light beam from the light source;
a first optical system that guides the light beam from the light source to the deflector;
a second optical system that guides the light beam from the deflector to a surface to be scanned; and
a housing that holds the light source and the deflector, wherein
at least one optical element included in one of the first optical system and the second optical system is attached to the housing via at least one intermediate member,
the at least one intermediate member is configured to be adjusted in two or more directions with respect to the housing,
the optical element is configured to be adjusted in two or more directions with respect to the intermediate member, and is configured to be eccentrically adjusted about an axis parallel to at least a sub-scanning direction,
at least one of adjustable directions of the at least one intermediate member with respect to the housing is different from at least one of adjustable directions of the optical element with respect to the at least one intermediate member,
the at least one intermediate member includes a surface which abuts the optical element and is fixed to the optical element by adhesion, and
the at least one intermediate member further includes a surface which abuts the housing and is fixed to the housing by adhesion.

14. The optical scanning device according to claim 13, wherein
a plurality of the intermediate members are provided, and
the plurality of intermediate members are arranged on both sides of the light beam passing through the optical element.

15. The optical scanning device according to claim 14, wherein
the plurality of intermediate members are arranged in either one of a main scanning direction and a sub-scanning direction of the optical element in which a size of an outer shape of the optical element is longer.

16. The optical scanning device according to claim 13, wherein
the at least one intermediate member has two flat portions that are orthogonal to each other and abut on the optical element and the housing.

17. The optical scanning device according to claim 13, wherein
the at least one intermediate member is transparent, and
the adhesive is made from ultraviolet curing resin.

18. The optical scanning device according to claim 13, wherein
the optical element is an anamorphic optical element included in the first optical system,
the at least one intermediate member is configured to be adjusted in an optical axis direction, and
the anamorphic optical element is configured to be adjusted with respect to the at least one intermediate member in a plane perpendicular to the optical axis direction.

19. An image forming apparatus comprising:
an optical scanning device that includes
a light source that emits a light beam;
a deflector that deflects the light beam from the light source;
a first optical system that guides the light beam from the light source to the deflector;
a second optical system that guides the light beam from the deflector to a surface to be scanned; and
a housing that holds the light source and the deflector, wherein
at least one optical element included in one of the first optical system and the second optical system is attached to the housing via at least one intermediate member,
the optical element is configured to be adjusted in two or more directions with respect to the at least one intermediate member, and the optical element is configured to be eccentrically adjusted about an axis parallel to at least a sub-scanning direction,
the at least one intermediate member includes a surface which abuts the optical element and is fixed to the optical element by adhesion, and the intermediate member further includes a surface which abuts the housing and is fixed to the housing by adhesion, and wherein the at least one intermediate member is configured to be adjusted in two or more directions with respect to the housing.

20. An image forming apparatus comprising:
an optical scanning device that includes
a light source that emits a light beam;
a deflector that deflects the light beam from the light source;
a first optical system that guides the light beam from the light source to the deflector;
a second optical system that guides the light beam from the deflector to a surface to be scanned; and
a housing that holds the light source and the deflector, wherein
at least one optical element included in one of the first optical system and the second optical system is attached to the housing via at least one intermediate member, the optical element configured to be eccentrically adjusted about an axis parallel to at least a sub-scanning direction,
the at least one intermediate member is configured to be adjusted in two or more directions with respect to the housing,
the at least one intermediate member includes a surface which abuts the optical element and is fixed to the optical element by adhesion, and the intermediate member further includes a surface which abuts the housing and is fixed to the housing by adhesion.

21. An image forming apparatus comprising:
an optical scanning device that includes
a light source that emits a light beam;
a deflector that deflects the light beam from the light source;
a first optical system that guides the light beam from the light source to the deflector;
a second optical system that guides the light beam from the deflector to a surface to be scanned; and
a housing that holds the light source and the deflector, wherein
at least one optical element included in one of the first optical system and the second optical system is attached to the housing via at least one intermediate member,
the at least one intermediate member is configured to be adjusted in two or more directions with respect to the housing,
the optical element is configured to be adjusted in two or more directions with respect to the at least one intermediate member, and the optical element is configured to be eccentrically adjusted about an axis parallel to at least a sub-scanning direction,
at least one of adjustable directions of the at least one intermediate member with respect to the housing is different from at least one of adjustable directions of the optical element with respect to the at least one intermediate member,
the at least one intermediate member includes a surface which abuts the optical element and is fixed to the optical element by adhesion, and
the at least one intermediate member further includes a surface which abuts the housing and is fixed to the housing by adhesion.

* * * * *